US007498386B2

(12) United States Patent
Karl et al.

(10) Patent No.: US 7,498,386 B2
(45) Date of Patent: Mar. 3, 2009

(54) DERIVATIVES OF POLYMERS FOR PERMANENT MODIFICATION OF HYDROPHOBIC POLYMERS

(75) Inventors: Ulrich Karl, Ludwigshafen (DE); Arno Lange, Bad Dürkheim (DE); Darijo Mijolovic, Mannheim (DE)

(73) Assignee: BASF SE, Ludwigshafen (DE)

( * ) Notice: Subject to any disclaimer, the term of this patent is extended or adjusted under 35 U.S.C. 154(b) by 491 days.

(21) Appl. No.: 10/530,929

(22) PCT Filed: Oct. 10, 2003

(86) PCT No.: PCT/EP03/11235

§ 371 (c)(1),
(2), (4) Date: Sep. 19, 2005

(87) PCT Pub. No.: WO2004/035635

PCT Pub. Date: Apr. 29, 2004

(65) Prior Publication Data

US 2006/0106173 A1    May 18, 2006

(30) Foreign Application Priority Data

Oct. 11, 2002   (DE)   ................................. 102 47 462

(51) Int. Cl.
| C08L 23/04 | (2006.01) |
| C08L 23/10 | (2006.01) |
| C08L 23/22 | (2006.01) |
| C08L 23/26 | (2006.01) |
| D06P 5/00  | (2006.01) |
| D06P 5/08  | (2006.01) |

(52) U.S. Cl. ........................... 525/191; 525/240; 8/506; 8/513

(58) Field of Classification Search ................. 525/232, 525/240, 19; 8/506, 513
See application file for complete search history.

(56) References Cited

U.S. PATENT DOCUMENTS

| 3,807,951 A | 4/1974 | Paleos et al. |
| 3,894,840 A | 7/1975 | von der Eltz et al. |
| 4,316,973 A | 2/1982 | Kennedy |
| 4,599,433 A | 7/1986 | Bronstert et al. |
| 4,987,190 A | 1/1991 | Keogh |
| 5,122,573 A | 6/1992 | Knoll et al. |
| 5,300,701 A | 4/1994 | Cherpeck |
| 5,712,341 A | 1/1998 | Hofmann et al. |
| 5,980,594 A | 11/1999 | Kropp et al. |
| 6,884,858 B2* | 4/2005 | Baxter. et al. ............... 526/133 |
| 2003/0187171 A1 | 10/2003 | Lange et al. |
| 2004/0154216 A1 | 8/2004 | Huffer et al. |

FOREIGN PATENT DOCUMENTS

| AU | 779884 B2 | 10/2001 |
| AU | 780570 B2 | 10/2001 |
| CA | 2 461 914 A1 | 4/2003 |
| DE | 1 298 711 | 7/1969 |
| DE | 2 240 534 | 2/1973 |
| DE | 2 210 878 | 9/1973 |
| DE | 43 19 672 | 12/1994 |
| DE | 44 33 273 | 3/1996 |
| DE | 101 25 158 A1 | 12/2002 |
| DE | 101 47 650 A1 | 4/2003 |
| EP | 0 039 207 A1 | 11/1981 |
| EP | 0 156 310 A2 | 10/1985 |
| EP | 0 324 278 | 7/1989 |
| EP | 0 342 792 | 11/1989 |
| EP | 0 397 499 | 11/1990 |
| EP | 0 410 180 | 1/1991 |
| EP | 0 410 180 A1 | 1/1991 |
| EP | 0 459 237 | 12/1991 |
| EP | 0 476 785 A1 | 3/1992 |
| EP | 0 673 949 | 9/1995 |
| EP | 0 709 403 | 5/1996 |
| GB | 1 374 265 | 11/1974 |
| JP | 2090/69 | 1/1969 |
| JP | 21196/69 | 9/1969 |
| JP | 44-31810 A1 | 12/1969 |
| JP | 7032394 | 10/1970 |
| WO | WO 93/06177 A1 | 4/1993 |
| WO | WO-94/09067 | 4/1994 |
| WO | WO-96/03479 | 2/1996 |
| WO | WO-96/26308 | 8/1996 |
| WO | WO-98/02468 | 1/1998 |
| WO | WO 01/25293 A1 | 4/2001 |
| WO | WO 01/25294 A1 | 4/2001 |
| WO | WO-01/70830 | 9/2001 |
| WO | WO-02/26840 | 4/2002 |

OTHER PUBLICATIONS

Flaris et al., New Technology for Dyeable Polypropylenes. *ANTEC 2000 Conference Proceedings*, vol. 3, 2826-2830 (2000).

(Continued)

*Primary Examiner*—Nathan M Nutter
(74) *Attorney, Agent, or Firm*—Connolly Bove Lodge & Hutz, LLP

(57) ABSTRACT

The present invention relates to polymer compositions comprising at least one hydrophobic polymer and at least one modified polyisobutene; fibers, films, moldings and their further processing products formed from this polymer composition, a process for producing the polymer composition according to the present invention, a process for producing the fibers, films and moldings formed from the polymer composition according to the present invention; dyed polymer compositions comprising at least one hydrophobic polymer, at least one modified polyisobutene and at least one dye; and also fibers, films and moldings formed from the dyed polymer composition according to the present invention and the use of modified polyisobutenes for treating hydrophobic polymers.

13 Claims, No Drawings

OTHER PUBLICATIONS

Lubnin et al., Synthesis and characterization of aldehyde-capped polyisobutylenes. *Polymer Bulletin*, 30, 19-24 (1993).

Maenz, Macromonomers based on low-molecular-weight polyisobutenes. *Die Angewandte Makromolekulare Chemie*, 242, 183-197 (1996).

Oppermann, Farbstoffe zum Färben von Polypropylen. *Melliand Textilberichte*, 77, 588-592 (1996).

Fiebig et al., Verbesserte Ausbeute und Egalität beim Färben von Polypropylen-Fasern. *Melliand Textilberichte*, 9, 604-605 (1997).

Kennedy, New Telechelic Elastomers. *J. Applied Polymer Science: Applied Polymer Symposium*, 39, 21-35 (1984).

\* cited by examiner

DERIVATIVES OF POLYMERS FOR PERMANENT MODIFICATION OF HYDROPHOBIC POLYMERS

The present invention relates to polymer compositions comprising at least one hydrophobic polymer and at least one modified polyisobutene; fibers, films, moldings and their further processing products formed from this polymer composition, a process for producing the polymer composition according to the present invention, a process for producing the fibers, films and moldings formed from the polymer composition according to the present invention; dyed polymer compositions comprising at least one hydrophobic polymer, at least one modified polyisobutene and at least one dye; and also fibers, films and moldings formed from the dyed polymer composition according to the present invention and the use of modified polyisobutenes for treating hydrophobic polymers.

Hydrophobic polymers, especially polyolefins, have numerous excellent properties such as low specific density, high breaking strength, good resistance to chemicals, low wettability by polar media such as water and alcohols, low water imbibition and attendant rapid drying and a low tendency to rot as well as low cost. They are readily processible into various forms such as fibers, films and moldings. The low wettability by polar substances and the low absorbability by these substances have a disadvantageous effect, however. Thus, hydrophobic polymers, especially polyolefins, and fibers, films and moldings formed therefrom are very difficult if not impossible to dye from aqueous baths, very difficult or impossible to coat or print and difficult to adhere to other materials. Coatings with polar materials, for example polymers or metals, have poor adhesion to a hydrophobic polymer surface.

These deficiencies are obstacles to an even wider use of hydrophobic polymers, especially polyolefins. For instance, despite their favorable properties, polypropylene fibers are rarely used as apparel fibers, specifically in the sports or outdoor apparel sector. To remedy these disadvantages of hydrophobic polymers, especially of polyolefins, numerous processes have been proposed for hydrophilicizing them as a precondition for dyeability, printability, coatability or adherability.

It is customary for hydrophobic polymer fibers to be solution dyed to obtain deep shades, ie for the color pigment to be added in the extruder in the course of the yarn production process. True, this gives dark and fast colorations, but only the production of large solution-dyed batches is commercially sensible, so that no fashion-based color requirements can be entertained. Nor is it possible to achieve brilliant shades. Finally, solution dyeing gives rise to large amounts of waste with any change in color.

Several fundamentally different methods are in existence for hydrophilicizing and hence for improving especially the dyeability of hydrophobic polymers, especially polyolefins, from aqueous dyebaths.

WO 93/06177 relates to the use of swelling agents to dye polymeric fibers which have a limited number of dye sites, especially polyolefin fibers, with disperse dyes. However, this approach, which is known as carrier dyeing in the case of polyester, entails human-toxicological and environmental problems due to the residues remaining in the textile.

Melliand Textilberichte 77 (1996) 588-592 and 78 (1997) 604-605 relates to the dyeing of polypropylene fibers with specific ultrahydrophobic disperse dyes under high temperature conditions, preferably in the additional presence of selected surfactants in the dyeing liquor, to increase the fixation yields and to obtain dyeings of high levelness. The problem here is that dyers and finishers would have to maintain an additional stock of dyes exclusively for polyolefin dyeing, and this would be very costly.

DE-A 2 210 878 relates to the dyeing of untreated polyolefin fibers with metal complex dyes. The metals used are chromium, copper, iron, cobalt, nickel, zinc or aluminum. The disadvantage with this process is that small amounts of the heavy metals used end up on the skin when thus dyed textiles are worn and may cause harmful effects.

There have also been numerous publications relating to a modification of the hydrophobic polyolefins, especially in order that improved dyeability may be achieved for polyolefin fibers.

JP-A 7032394, JP-A 6902090, JP-A 6921196 and JP-A 6931810 each relate to the incorporation of metal complexes into the polymer matrix during fiber production. These metal complexes can then lock the dye into the fiber interior. One disadvantage with this process is again that small amounts of the metals used (among those mentioned are nickel, zinc, chromium, copper, cobalt and aluminum) end up on the skin when thus dyed textiles are worn and may cause harmful effects.

EP-A 0 039 207 relates to modifying the polyolefin fiber by incorporating nitrogenous basic copolymers into the spinning melt of the polyolefin material. This locks these basic copolymers into the macromolecule. These modified polyolefins then have an affinity for anionic dyes.

V. Flaris, Annual Techn. Conf. Soc. Plastic Engineers 2000, 2826-2830 relates to dyeable polypropylene fibers which have been modified by mixing with a reaction product of maleate polypropylene with a polyetheramine. However, the modified polymer has a yellowish discoloration and the modifying reaction product has to be used in such large amounts that the fiber properties of the polypropylene, for example its breaking strength, are impaired.

DE-A 2 240 534 relates to dyeable polyolefin-based compositions which include a polyamine adduct which has at least one hydrocarbyl chain of at least 25 carbon atoms which is attached to a nitrogen atom. The additives are incorporated into the composition by mixing with the polyolefin. Disadvantages with this process are the large amounts of additives needed to achieve dyeability (at least 3% by weight and preferably 5-15% by weight, based on the composition) and the fact that these additives are obtained from chlorinated polyisobutenes.

Polyolefins may further be modified by grafting.

WO 96/26308 relates to the grafting of polyolefins with polar monomers, for example dialkylamino methacrylates, that are able to enter bonds with dyes. The substrate is impregnated with the polar monomer and an initiator and reacted therewith by heating. This process is thus very costly and inconvenient and requires the handling of monomers which may be harmful.

U.S. Pat. No. 3,807,951 relates to grafted polyolefins which have been grafted with nitrogen-containing monomers such as N-vinylpyridine, N-vinylpyrrolidone or dialkylamino methacrylates. The graft polymer is subsequently quaternized to render it dyeable with anionic dyes. One disadvantage with this process is that it is very complicated to carry out and hence very costly. Furthermore, the free-radical initiators used in the grafting often cause substantial shortening of the polymer chains of the polyolefin, so that its performance properties are impaired.

WO 94/09067 relates to mixtures of functionalized and unfunctionalized polyolefins. The functionalization of the polyolefins is accomplished by reaction with a carboxylic anhydride, preferably maleic anhydride. This confers improved affinity for polar materials, improved dyeability and printability on polyolefins. The disadvantage is that a mixing operation has to be carried out as well as grafting.

It is an object of the present invention to provide hydrophobic polymers, especially polyolefins, that are modifiable with hydrophilic materials which are in particular dyeable, printable, coatable and adherable. The modification of the hydrophobic polymers, especially polyolefins, shall be accomplished in a simple process using environmentally friendly and inexpensive substances.

We have found that this object is achieved by a polymer composition comprising
a) at least one hydrophobic polymer, and
b) at least one polyisobutene which is modified by terminal polar groups and is obtainable by functionalization of reactive polyisobutene having a number average molecular weight $M_n$ from 150 to 50 000.

The polymer compositions according to the present invention are simple to produce and are effective to hydrophilicize the hydrophobic polymers used, so that the polymer compositions and also further processing products of the polymer compositions are dyeable, printable, coatable and adherable without the need to use special dyes, coatings or adhesives.

Component A (Hydrophobic Polymers)

Any hydrophobic polymer is suitable in principle. Polyolefins are preferred. Any known polyolefin is suitable in principle. Preference is given to polyolefins constructed of basic $C_2$-$C_4$ structural repeat units. They can be homopolymers or they can be copolymers, in which case the copolymers can be random copolymers or block copolymers. Ethylene and other α-olefins, dienes or polyenes are suitable comonomers, depending on the polyolefin's basic structural repeat units. The fraction of the copolymer that is attributable to comonomers is generally not more than 40% by weight, for example 20-30% or 2-10%, depending on the application.

The polymer compositions according to the present invention more preferably comprise homo- or copolymers of propylene or of ethylene.

In a preferred embodiment, the polyolefin used is polyethylene and more preferably linear polyethylene (HDPE, LLDPE). This can be used in the form of its homopolymer or as a random or block copolymer, in which case all customary comonomers can be used.

In a further particularly preferred embodiment, the polyolefin used is polypropylene. The polypropylene in question can be a homopolymer or a random or block copolymer of propylene.

The random or block polypropylenes can contain up to 40% by weight of a comonomer. Suitable comonomers include for example ethylene or α-olefins, dienes such as 1,4-hexa-diene, 1,5-hexadiene, 1,6-heptadiene, 2-methyl-1, 4-pentadiene, 1,7-octadiene, 6-methyl-1,5-heptadiene, or polyenes such as octatriene or dicyclopentadiene.

The polymers can generally be atactic, isotactic or syndiotactic, preference being given to isotactic polymers. The polymers are produced by conventional methods, for example by using Ziegler-Natta or metallocene catalysts.

Further details will be known to one skilled in the art or can be read up for example in the polyolefins chapter of "Ullmanns Encyclopedia (of Technical Chemistry), 6$^{th}$ Edition, 2000 Electronic Release" and the references cited therein.

Component B (Modified Polyisobutene)

The modified polyisobutene used as component B is a polyisobutene which is modified by terminal polar groups and obtainable by functionalization of polyisobutene having a number average molecular weight $M_n$ from 150 to 50 000 and containing not less than 60 mol % of terminal double bonds (α- and/or β-olefins) or their precursor.

The modified polyisobutenes can be linear or substantially linear polyisobutene derivatives which have a polar group only at one chain end. Structures of this kind are known as head-to-tail structures. They can further be linear or substantially linear polyisobutene derivatives which have polar groups at both chain ends. Furthermore, it is also possible to use branched polyisobutene derivatives which contain three or more chain ends having polar groups. The present invention is not restricted to a particular branching pattern. Naturally, mixtures of various polyisobutene derivatives can also be used for the polymer compositions according to the present invention.

The modified polyisobutene derivatives are obtainable by functionalization of reactive polyisobutene starting material. Reactive polyisobutene for the purposes of the present invention is polyisobutene having reactive groups at one or two or—when branched reactive polyisobutenes are used—at three or more chain ends.

The reactive groups at the chain ends may in principle be any desired group, provided they can be suitably reacted to give a terminal polar group. The reactive groups are preferably α- or β-olefin groups and also —$C(CH_3)_2$-Z groups, which can be reacted directly or following elimination by way of the olefin stage. In order to be able to achieve the degrees of functionalization specified at the outset, it is necessary in each case for there to be at least a corresponding amount of reactive chain ends in the unmodified polyisobutylene. Polyisobutylene chains having a nonreactive chain end such as —$C(CH_3)$=$C(CH_3)$—$CH(CH_3)_2$ do not undergo polar modification, are ineffective and/or impair the effect. It is therefore preferable for there to be a relatively large amount of reactive chain ends present. Preferably, the reactive chain ends are formed in a basically known manner in the course of the termination of the polymerization, although it is also possible—albeit not preferable—for the chain ends to be provided with reactive groups in a separate reaction step. The reactive polyisobutene more preferably contains not less than 50 mol %, preferably not less than 60 mol % and more preferably not less than 80 mol % of terminal double bonds. Terminal double bonds of polyisobutene refers to double bonds in the α- or β-position of the polyisobutene.

The reactive polyisobutene for the purposes of this invention preferably refers to a polyisobutene which in total contains not less than 60% of units derived from vinyl isomer (β-olefin, R—CH=$C(CH_3)_2$) and/or vinylidene isomer (α-olefin, R—$C(CH_3)$=$CH_2$) or appropriate precursors such as R—$C(CH_3)_2$Cl.

The polyisobutenes used according to the present invention have a number average molecular weight $M_n$ from 150 to 50 000, preferably from 200 to 35 000 and more preferably from 300 to 6000, for example about 550, about 1000 or about 2300. The molecular weight distribution of the polyisobutenes used according to the present invention is generally narrow. The molecular weight distribution ($M_w/M_n$) is preferably in the range from 1.05 to 4 and more preferably in the range from 2 to 3. If desired, however, it is also possible to use polyisobutenes having a broader molecular weight distribution of for example >5 or even >12.

Suitable reactive polyisobutenes are obtainable for example by cationic polymerization of isobutene.

Suitable starting materials are preferably synthesized using isobutene alone. However, cationically polymerizable comonomers may also be used as well. The amount of comonomers, however, should generally be less than 20% by weight, preferably less than 10% by weight and more preferably less than 5% by weight.

Suitable comonomers include in particular styrenics such as styrene and α-methylstyrene, $C_1$-$C_4$-alkylstyrenes such as 2-, 3- and 4-methylstyrene, and also 4-tert-butylstyrene, $C_3$- to $C_6$-alkenes such as n-butene, isoolefins having from 5 to 10 carbon atoms such as 2-methylbutene-1,2-methylpentene-1, 2-methylhexene-1,2-ethylpentene-1,2-ethylhexene-1 and 2-propylheptene-1.

Isobutene feedstocks suitable for synthesizing the starting material include not only isobutene itself but also isobutene-containing $C_4$ hydrocarbon streams, for example $C_4$ raffinates, $C_4$ cuts from isobutene dehydrogenation, $C_4$ cuts from steam crackers or fluid catalyzed cracking (FCC) crackers, provided they have been substantially freed of 1,3-butadiene present therein. $C_4$ hydrocarbon streams suitable according to the present invention generally contain less than 500 ppm and preferably less than 200 ppm of butadiene. The presence of butene-1, cis-butene-2 and trans-butene-2 is substantially uncritical for the process of the present invention and does not lead to selectivity losses. The concentration in the $C_4$ hydrocarbon streams is typically in the range from 40% to 60% by weight. When $C_4$ cuts are used as a feedstock, the hydrocarbons other than isobutene perform the function of an inert solvent.

The reaction may be catalyzed with $BF_3$ alone, $BF_3$ complexes with electron donors or mixtures thereof. Electron donors (Lewis bases) are compounds which have a free electron pair, on an oxygen, nitrogen, phosphorus or sulfur atom for example, and are able to form complexes with Lewis acids. This complexing is desirable in many cases, since it reduces the activity of the Lewis acid and suppresses side reactions. Examples of suitable electron donors are ethers such as diisopropyl ether or tetrahydrofuran, amines such as triethylamine, amides such as dimethylacetamide, alcohols such as methanol, ethanol, i-propanol or t-butanol. The alcohols additionally act as a source of protons and so initiate the polymerization. A cationic polymerization mechanism may also be activated via protons from ubiquitous traces of water.

Suitable solvents for the polymerization include all organic compounds which are liquid in the selected temperature range and which neither detach protons nor possess free electron pairs. These include in particular cyclic and acyclic alkanes such as ethane, isopropane, n-propane, n-butane and its isomers, cyclopentane and also n-pentane and its isomers, cyclohexane and also n-hexane and its isomers, n-heptane and its isomers and also higher homologs, cyclic and acyclic alkenes such as ethene, isopropene, n-propene, n-butene, cyclopentene and also n-pentene, cyclohexene and also n-hexene, n-heptene, aromatic hydrocarbons such as benzene, toluene or the isomeric xylenes. The hydrocarbons may also be halogenated. Examples of halogenated hydrocarbons include methyl chloride, methyl bromide, methylene chloride, methylene bromide, ethyl chloride, ethyl bromide, 1,2-dichloroethane, 1,1,1-trichloroethane, chloroform and chlorobenzene. Mixtures of the solvents can also be used, provided no undesirable properties occur.

From an engineering standpoint it is particularly advisable to use solvents which boil in the desired temperature range. The polymerization typically takes place at from $-80°$ C. to $0°$ C., preferably from $-50°$ C. to $-5°$ C. and more preferably at from $-30°$ C. to $-15°$ C.

Cationic polymerization under $BF_3$ catalysis produces substantially linear polyisobutenes which have a particularly high α-olefin group content at one chain end. With a suitable reaction regime, the α-olefin content will not be less than 80%.

Reactive polyisobutenes which have reactive α-olefin groups at both chain ends or which are branched may be obtained in a particularly elegant fashion by means of living cationic polymerization. Obviously, linear polyisobutenes which have an α-olefin group only at one chain end may also be synthesized by this method, however.

In a living cationic polymerization, isobutene is polymerized with a suitable combination of an initiator molecule $IX_n$ with a Lewis acid S. Details of this method of polymerization are disclosed for example in Kennedy and Ivan, "Carbocationic Macromolecular Engineering", Hanser Publishers 1992.

Suitable initiator molecules $IX_n$ have one or more leaving groups X. The leaving group X is a Lewis base, which may be further substituted. Examples of suitable leaving groups include the halogens fluorine, chlorine, bromine and iodine, straight-chain and branched alkoxy groups, such as $C_2H_5O-$, n-$C_3H_7O-$, i-$C_3H_7O-$, n-$C_4H_9O-$, i-$C_4H_9O-$, sec-$C_4H_9O-$ or t-$C_4H_9O-$, and also straight-chain and branched carboxyl groups such as $CH_3CO-O-$, $C_2H_5CO-O-$, n-$C_3H_7CO-O-$, i-$C_3H_7CO-O-$, n-$C_4H_9CO-O-$, i-$C_4H_9CO-O-$, sec-$C_4H_9CO-O-$, t-$C_4H_9CO-O-$. Connected to the leaving group or groups is the moiety I, which is able to form carbocations $I^+$ which are sufficiently stable under reaction conditions. To initiate the polymerization, the leaving group is abstracted by means of a suitable Lewis acid S: $I-X+S-->I^++XS^-$ (shown here only for n=1). The resulting carbocation $I^+$ initiates the cationic polymerization and is incorporated into the resulting polymer. Examples of suitable Lewis acids S include $AlY_3$, $TiY_4$, $BY_3$, $SnY_4$, $ZnY_2$ where Y is fluorine, chlorine, bromine or iodine. The polymerization reaction can be terminated by destroying the Lewis acid, for example by reacting it with an alcohol. This produces polyisobutene which possesses the terminal-$C(CH_3)_2$-Z groups, which can subsequently be converted into α- and β-olefin end groups.

Preferred initiator molecules are structures which are capable of forming tertiary carbocations. Particular preference is given to radicals which derive from the lower oligomers of isobutene, $H-[CH_2-C(CH_3)_2]_n-X$, where n is preferably from 2 to 5. Linear reactive polyisobutenes formed using such initiator molecules have a reactive group at one end only.

Linear polyisobutenes which have reactive groups at both ends are obtainable using initiator molecules IXQ which have two leaving groups X and Q, which may be the same or different. Compounds which contain $-C(CH_3)_2-X$ groups are established in the art. Examples include straight-chain or branched alkylene radicals $C_nH_{2n}$ (where n is preferably from 4 to 30), which may be interrupted by a double bond or by an aromatic moiety, such as $X-(CH_3)_2C-CH_2-C(CH_3)_2$-Q, $X-(CH_3)_2C-CH_2-C(CH_3)_2CH_2-C(CH_3)_2$-Q, $X-(CH_3)_2C-CH_2-C(CH_3)_2CH_2-C(CH_3)_2CH_2-C(CH_3)_2$-Q or $X-(CH_3)_2C-CH_2-C(CH_3)_2CH_2-C(CH_3)_2CH_2-C(CH_3)_2-CH_2-C(CH_3)_2$-Q, $X-(CH_3)_2C-CH=CH-C(CH_3)_2$-Q or para and/or meta $X-(CH_3)_2C-C_6H_4-C(CH_3)_2$-Q.

Branched polyisobutenes are obtainable using initiator molecules $IX_n$ which have 3 or more leaving groups, which may be the same or different. Examples of suitable initiator molecules include $X-(CH_3)_2C-C_6H_3-[C(CH_3)_2-Q]$-C $(CH_3)_2$—P as 1,2,4 and/or 1,3,5 isomer, the leaving groups preferably being the same, but they can also be different. Further examples of mono-, di-, tri- or polyfunctional initiator molecules can be found in the Kennedy and Ivan paper which was cited at the outset and also in the references cited therein.

The reactive polyisobutenes are reacted with suitable reagents to give the desired polyisobutene derivatives having terminal polar groups.

The degree of functionalization of the modified polyisobutene derivatives having terminal polar groups is not less than 65%, preferably not less than 75% and most preferably not less than 85%. In the case of the polymers having polar groups at one chain end only, this figure refers only to said one chain end. In the case of the polymers having polar groups at both chain ends, and also in the case of the branched products, this figure refers to the total number of all chain ends. The unfunctionalized chain ends comprise both those which do not have a reactive group at all and those in which a reactive group, although present, was not converted in the course of the functionalization reaction.

The term "polar group" is known to one skilled in the art. The polar groups may be protic as well as aprotic polar groups. The modified polyisobutenes thus have a hydrophobic moiety comprising a polyisobutene radical and also a moiety, having a certain hydrophilic character at least to some extent, comprising terminal polar groups. The groups in question are preferably strongly hydrophilic groups. The terms "hydrophilic" and "hydrophobic" are known to one skilled in the art.

Polar groups include for example sulfonic acid radicals, anhydrides, carboxyl groups, carboxamides, OH groups, polyoxyalkylene groups, amino groups, epoxides or suitable silanes which may be suitably substituted.

Suitable reactions for introducing polar groups (functionalization) are known in principle to one skilled in the art.

In principle, the functionalization of the polyisobutenes used according to the present invention can be carried out in one or more stages.

In a preferred embodiment, the functionalization of the polyisobutene used according to the invention is accomplished in one or more stages and is selected from:

i) reaction with aromatic hydroxy compounds in the presence of an alkylation catalyst to obtain polyisobutene-alkylated aromatic hydroxy compounds, ii) reaction of the polyisobutene with a peroxy compound to obtain an epoxidized polyisobutene, iii) reaction of the polyisobutene with an alkene having an electrophilically substituted double bond (an enophile) in an ene reaction, iv) reaction of the polyisobutene with carbon monoxide and hydrogen in the presence of a hydroformylation catalyst to obtain a hydroformylated polyisobutene, v) reaction of the polyisobutene with hydrogen sulfide or a thiol to obtain a thio-functionalized polyisobutene, vi) reaction of the polyisobutene with a silane in the presence of a silylation catalyst to obtain a silyl-functionalized polyisobutene, vii) reaction of the polyisobutene with halogen or a hydrogen halide to obtain a halogen-functionalized polyisobutene, viii) reaction of the polyisobutene with a borane and subsequent oxidative cleavage to obtain a hydroxylated polyisobutene, ix) reaction of the polyisobutene with an $SO_3$ source, preferably acetyl sulfate, to obtain a polyisobutene having terminal sulfonic acid groups, x) reaction of the polyisobutene with nitrogen oxides and subsequent hydrogenation to obtain a polyisobutene having terminal amino groups.

Re i): Alkylation of Aromatic Hydroxy Compounds

The reactive polyisobutene may be derivatized by reaction with an aromatic hydroxy compound in the presence of an alkylation catalyst. Suitable catalysts and reaction conditions for this Friedel-Crafts alkylation are described for example in J. March, Advanced Organic Chemistry, 4th edition, John Wiley & Sons, pages 534-539, incorporated herein by reference.

The aromatic hydroxy compound used for alkylation is preferably selected from phenolic compounds having 1, 2 or 3 OH groups, which may optionally contain at least one further substituent. Preferred further substituents are $C_1$-$C_8$-alkyl groups and especially methyl and ethyl. Preference is given in particular to compounds of the general formula

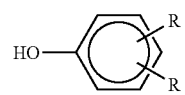

where $R^1$ and $R^2$ are independently hydrogen, OH or $CH_3$. Particular preference is given to phenol, the cresol isomers, catechol, resorcinol, pyrogallol, fluoroglucinol and the xylenol isomers. Phenol, o-cresol and p-cresol are used in particular. If desired, it is also possible to use mixtures of the aforementioned compounds for alkylation.

The catalyst is preferably selected from Lewis-acid alkylation catalysts, which for the purposes of the present invention comprehends not only individual acceptor atoms but also acceptor-ligand complexes, molecules, etc, provided these have net Lewis acid (electron acceptor) properties. This includes for example $AlCl_3$, $AlBr_3$, $BF_3$, $BF_3 2\,C_6H_5OH$, $BF_3 [O(C_2H_5)_2]_2$, $TiCl_4$, $SnCl_4$, $AlC_2H_5Cl_2$, $FeCl_3$, $SbCl_5$ and $SbF_5$. These alkylation catalysts can be used together with a cocatalyst, for example an ether. Suitable ethers are di-($C_1$-$C_8$-)alkyl ethers, such as dimethyl ether, diethyl ether, di-n-propyl ether, and also tetrahydrofuran, di-($C_5$-$C_8$-)cycloalkyl ethers, such as dicyclohexyl ether and ethers having at least one aromatic hydrocarbyl, such as anisole. When a catalyst-cocatalyst complex is used for Friedel-Crafts alkylation, the molar ratio of catalyst to cocatalyst is preferably in the range from 1:10 to 10:1. The reaction can also be catalyzed with protic acids such as sulfuric acid, phosphoric acid and trifluoromethanesulfonic acid. Organic protic acids can be present in polymer-bound form, for example as ion exchange resin.

The alkylation can be carried out with or without a solvent. Examples of suitable solvents are n-alkanes and mixtures thereof and alkylaromatics, such as toluene, ethylbenzene and xylene and also halogenated derivatives thereof.

The alkylation is preferably carried out from −10° C. to +100° C. The reaction is customarily carried out at atmospheric pressure, but can also be carried out at superatmospheric or reduced pressure.

The fraction of alkylated products which is obtained and their degree of alkylation can be controlled through suitable choice of the molar ratios of aromatic hydroxy compound to polyisobutene and of the catalyst. For instance, substantially monoalkylated polyiso-butenylphenols are generally obtained from an excess of phenol or in the presence of a Lewis-acid alkylation catalyst when an ether cocatalyst is used in addition.

The reaction of polyisobutenes with phenols in the presence of suitable alkylation catalysts is disclosed for example in U.S. Pat. No. 5,300,701 and WO 02/26840.

A polyisobutenylphenol obtained in step i) may be further functionalized by Mannich reaction with at least one aldehyde, for example formaldehyde, and at least one amine which has at least one primary or secondary amine function to obtain a polyisobutene-alkylated and additionally at least partially aminoalkylated compound. It is also possible to use reaction and/or condensation products of aldehyde and/or amine. The preparation of such compounds is described in WO 01/25 293 and WO 01/25 294 again, which are each hereby incorporated herein in full by reference.

A polyisobutenylphenol obtained in step i) may further be alkoxylated with alkylene oxides, preferably ethylene oxide.

ii) Epoxidation

The reactive polyisobutene may be functionalized by reaction with at least one peroxy compound to obtain an epoxidized polyisobutene. Suitable epoxidation methods are described in J. March, Advanced Organic Chemistry, 4th edition, John Wiley & Sons, pages 826-829, incorporated herein by reference. Preferably, the peroxy compound used is at least one peracid, such as m-chloroperbenzoic acid, performic acid, peracetic acid, trifluoroperactic acid, perbenzoic acid and 3,5-dinitroperbenzoic acid. The peracids may be prepared in situ from the corresponding acids and $H_2O_2$ in the presence or absence of mineral acids. Further suitable epoxidizing reagents include for example alkaline hydrogen peroxide, molecular oxygen and alkyl peroxides, such as tert-butyl hydroperoxide. Examples of suitable solvents for the epoxidation are customary apolar solvents. Particularly suitable solvents are hydrocarbons such as toluene, xylene, hexane and heptane.

The epoxidized polyisobutenes obtained in step ii) may be further functionalized by reaction with ammonia to obtain polyisobutene amino alcohols (EP-A 0 476 785).

iii) Ene Reaction

The reactive polyisobutene may further be functionalized by reaction with at least one alkene which has a nucleophilically substituted double bond in an ene reaction (see for example DE-A 4 319 672 or H. Mach and P. Rath in "Lubrication Science II" (1999), pages 175-185, fully incorporated herein by reference). In an ene reaction, an alk-ene having an allyl-disposed hydrogen atom is reacted with a nucleophilic alkene, the enophile, in a pericyclic reaction comprising a carbon-carbon bond formation, a double bond shift and a hydrogen transfer. In the present case, the reactive polyisobutene acts as an ene. Suitable enophiles are compounds which are used as dienophiles in the Diels-Alder reaction. The preferred enophile is maleic anhydride. This produces polyisobutenes functionalized with succinic anhydride groups (polyisobutenylsuccinic anhydride, PIBSA), as disclosed in EP-A 0 156 310.

The ene reaction may optionally be carried out in the presence of a Lewis acid catalyst. Suitable examples are aluminum chloride and ethylaluminum chloride.

The reaction creates a new α-olefin group at the chain end. A polyisobutene derivatized with succinic anhydride groups, for example, may be further functionalized by subjecting it to a second reaction selected from:
 a) reaction with at least one amine to obtain a polyisobutene partly or fully functionalized with succinimic and/or succinamide groups,
 b) reaction with at least one alcohol to obtain a polyisobutene functionalized with succinic ester groups,
 c) reaction with at least one thiol to obtain a polyisobutene functionalized with succinic thioester groups, and
 d) reaction with maleic anhydride to obtain a product having two succinic anhydride groups at the chain end (known as PIBBSA).
 e) Hydrolysis to obtain a polyisobutene functionalized with succinic acid groups which may be converted into salts. Suitable cations in salts are in particular alkali metal cations, ammonium ions and also alkylammonium ions.

Re a) and b)

The succinic anhydride groups may be reacted with polar reactants such as alcohols and amines, for example, by way of further derivatization. The suitable polar reactants are preferably primary alcohols ROH, primary amines $RNH_2$ or secondary amines RR'NH, where R is a linear or branched saturated hydrocarbyl radical which bears at least one substituent selected from the group consisting of OH, $NH_2$ and $NH_3^+$ and optionally one or more CH(O) groups and optionally has nonadjacent —O— and/or —NH— and/or tertiary —N-groups, and R' has the same meanings independently of R. Both carboxylic acid groups of the succinic anhydride may be reacted or else only one carboxylic acid group while the other carboxylic acid group is present as a free acid group or as a salt. The above substituents may be further modified, for example by alkoxylation.

Further synthetic variants for derivatizing succinic anhydride groups are mentioned in the applications bearing the file references DE 101 251 58.0 and DE 101 476 50.7.

It is also known to one skilled in the art to convert a succinic anhydride group into a succinimide group under suitable conditions.

iv) Hydroformylation

The reactive polyisobutene may be functionalized by reaction with carbon monoxide and hydrogen in the presence of a hydroformylation catalyst to form a hydroformylated polyisobutene.

Suitable hydroformylation catalysts are known and preferably comprise a compound or complex of an element of transition group VIII of the Periodic Table, such as Co, Rh, Ir, Ru, Pd or Pt. To influence activity/selectivity, it is preferable to use hydroformylation catalysts modified by N- or P-containing ligands. Suitable salts of these metals are for example the hydrides, halides, nitrates, sulfates, oxides, sulfides or the salts with alkyl- or arylcarboxylic acids or alkyl- or arylsulfonic acids. Suitable complexes have ligands which are selected for example from halides, amines, carboxylates, acetylacetonate, aryl- or alkylsulfonates, hydride, CO, olefins, dienes, cycloolefins, nitriles, N-containing heterocycles, aromats and hetaromats, ethers, $PF_3$, phosphols, phosphabenzenes and also mono-, bi- and more highly dentate phosphine, phosphinite, phosphonite, phosphoramidite and phosphite ligands.

In general, the catalysts or catalyst precursors used in each case are converted under hydroformylation conditions into catalytically active species of the general formula $H_xM_y(CO)_zL_q$, where M is a metal of transition group VIII, L is a ligand and q, x, y and z are integers which depend on the valency and nature of the metal and also on the number of coordination sites occupied by the ligand L.

In a preferred embodiment, the hydroformylation catalysts are prepared in situ in the reactor used for the hydroformylation reaction.

Another preferred embodiment utilizes a carbonyl generator whereby previously prepared carbonyl is adsorbed onto, for example, activated carbon and only the desorbed carbonyl but not the salt solutions from which the carbonyl is produced is fed to the hydroformylation.

Suitable catalysts include rhodium compounds or complexes, for example rhodium(III) and rhodium(III) salts, such as rhodium(III) chloride, rhodium(III) nitrate, rhodium(III) sulfate, potassium rhodium sulfate, rhodium(III) or rhodium(III) carboxylate, rhodium(II) and rhodium(III) acetate, rhodium(III) oxide, salts of rhodic(III) acid, trisammoniumhexachlororhodate(III), etc. It is also possible to use rhodium complexes, such as rhodium biscarbonylacetylacetonate, acetylacetonatobisethylenerhodium(I), etc.

Useful catalysts further include ruthenium salts or compounds. Suitable ruthenium salts are for example ruthenium(III) chloride, ruthenium(IV) oxide, ruthenium(VI) oxide, ruthenium(VIII) oxide, alkali metal salts of ruthenium oxo acids such as $K_2RuO_4$ or $KRuO_4$ or complexes such as for example $RuHCl(CO)(PPh_3)_3$. It is also possible to use the carbonyls of ruthenium such as dodecacarbonyl triruthenium or octadecacarbonyl hexaruthenium or mixed forms in which CO is partly replaced by ligands of the formula $PR_3$, such as $Ru(CO)_3(PPh_3)_2$.

Suitable cobalt compounds are for example cobalt(III) chloride, cobalt(II) sulfate, cobalt(II) carbonate, cobalt(II) nitrate, their amine or aquo complexes, cobalt carboxylates, such as cobalt formate, cobalt acetate, cobalt ethylhexanoate, cobalt naphthenate and also the cobalt-caprolactamate complex. It is similarly possible to use the carbonyl complexes of cobalt such as octacarbonyl dicobalt, dodecacarbonyl tetracobalt and hexadecacarbonyl hexacobalt.

The aforementioned compounds and further suitable compounds are known in principle and are extensively described in the literature.

Suitable activating agents which can be used for hydroformylation include for example Brönsted acids, Lewis acids, such as $BF_3$, $AlCl_3$ and $ZnCl_2$, and Lewis bases.

The composition of the synthesis gas used, comprising carbon monoxide and hydrogen, can vary within wide limits. The molar ratio of carbon monoxide to hydrogen is generally in the range of about 5:95-95:5 and preferably about 40:60-60:40. The temperature in the hydroformylation is generally in the range of about 20-200° C. and preferably about 50-190° C. The reaction is generally carried out at the partial pressure of the reaction gas at the reaction temperature chosen. The pressure is generally in the range of about 1-700 bar and preferably in the range from 1 to 300 bar.

The carbonyl number of the hydroformylated polyisobutenes obtained depends on the number average molecular weight $M_n$. The carbonyl numbers of products having a number average molecular weight $M_n$ of 10 000 dalton are preferably in the range from 2 to 5.6 mg of KOH/g and especially in the range from 3.6 to 5.6 mg of KOH/g. Products having a number average molecular weight $M_n$ of 40 000 dalton have carbonyl numbers from 0.5 to 1.4 mg of KOH/g and especially from 0.9 to 1.4 mg of KOH/g. The carbonyl numbers for products having other molecular weights can be determined by interpolation or extrapolation.

It is preferable for the predominant portion of the double bonds present in the medium molecular weight reactive polyisobutene used to be converted into aldehydes by the hydroformylation. The use of suitable hydroformylation catalysts and/or of an excess of hydrogen in the synthesis gas used also makes it possible to convert the predominant portion of the ethylenically unsaturated double bonds present in the reactant directly into alcohols (see for example DE-A 100 03 105). This can also be achieved in a two-stage functionalization as per the hereinbelow described reaction step B).

The functionalized polyisobutenes obtained by hydroformylation are very useful as intermediates for further processing by functionalization of some or all of the aldehyde functions they contain.

A) Oxo Carboxylic Acids

The hydroformylated polyisobutenes obtained in step iv) may be further functionalized by reaction with an oxidizing agent to obtain a polyisobutene partially or fully functionalized by carboxyl groups.

Aldehydes can be oxidized to carboxylic acids using in general a large number of different oxidizing agents and processes which are described for example in J. March, Advanced Organic Chemistry, John Wiley & Sons, 4th edition, pages 701ff. (1992). These include for example oxidation with permanganate, chromate, atmospheric oxygen, etc. Oxidation with air/oxygen can be carried out not only catalytically in the presence of metal salts but also in the absence of catalysts. Preferred metals are capable of a valency change, such as Cu, Fe, Co, Mn, etc. The reaction generally also succeeds in the absence of a catalyst. In the case of air oxidation, the conversion can readily be controlled via the reaction time.

In a further embodiment, the oxidizing agent used is an aqueous hydrogen peroxide solution in combination with a carboxylic acid, for example acetic acid. The acid number of the resulting polyisobutenes having a carboxyl function depends on the number average molecular weight $M_n$. The acid numbers of products having a number average molecular weight $M_n$ of 10 000 dalton are preferably in the range from 2 to 5.6 mg of KOH/g and especially in the range from 3.6 to 5.6 mg of KOH/g. Products having a number average molecular weight $M_n$ of 40 000 dalton have acid numbers in the range from 0.5 to 1.4 mg of KOH/g and especially in the range from 0.9 to 1.4 mg of KOH/g. The acid numbers of products having other molecular weights can be determined by interpolation or extrapolation.

B) Oxo Alcohols

In a further suitable embodiment, the hydroformylated polyisobutenes obtained in step iv) can be subjected to a reaction with hydrogen in the presence of a hydrogenation catalyst to give a polyisobutene which is partially or fully functionalized by alcohol groups.

Suitable hydrogenation catalysts are generally transition metals such as Cr, Mo, W, Fe, Rh, Co, Ni, Pd, Pt, Ru, etc, or mixtures thereof that can be applied to supports such as activated carbon, alumina, kieselguhr, etc to increase the activity and stability. To increase the catalytic activity, it is possible to use Fe, Co and preferably Ni in the form of Raney catalysts as a metal sponge having a very large surface area.

The hydrogenation of the oxo aldehydes from step iv) is preferably carried out at elevated temperatures and elevated pressure, depending on the activity of the catalyst. Preferably the reaction temperature is about 80-150° C. and the pressure about 50-350 bar.

The alcohol number of the resulting polyisobutenes having hydroxyl groups depends on the number average molecular weight $M_n$. The alcohol numbers of products having a number average molecular weight $M_n$ of 10 000 dalton are preferably in the range from 2 to 5.6 mg of KOH/g and especially in the range from 3.6 to 5.6 mg of KOH/g. Products having a number average molecular weight $M_n$ of 40 000 dalton have alcohol numbers from 0.5 to 1.4 mg of KOH/g and especially from 0.9 to 1.4 mg of KOH/g. The alcohol numbers of products having other molecular weights can be determined by interpolation or extrapolation.

The alcohol-functionalized polyisobutenes can additionally be alkoxylated with alkylene oxides, preferably ethylene oxide.

C) Amine Synthesis

In a further suitable embodiment, the hydroformylated polyisobutenes obtained in step iv) are further functionalized by reaction with hydrogen and ammonia or a primary or secondary amine in the presence of an amination catalyst to obtain a polyisobutene which is partially or fully functionalized by amine groups.

Suitable amination catalysts are the hydrogenation catalysts described above in step B), preferably copper, cobalt or nickel, that can be used in the form of the Raney metals or on a support. It is also possible to use platinum catalysts.

Amination with ammonia gives aminated polyisobutenes having primary amino functions. Useful primary and secondary amines for amination are compounds of the general formulae R—$NH_2$ and RR'NH, where R and R' are independently for example $C_1$-$C_{10}$-alkyl, $C_6$-$C_{20}$-aryl, $C_7$-$C_{20}$-arylalkyl, $C_7$-$C_{20}$-alkylaryl or cycloalkyl.

The amine number of the resulting polyisobutenes having amino groups depends on the number average molecular weight $M_n$. The amine numbers of products having a number average molecular weight $M_n$ of 10 000 dalton are preferably in the range from 2 to 5.6 mg of KOH/g and especially in the range from 3.6 to 5.6 mg of KOH/g. Products having a number average molecular weight $M_n$ of 40 000 dalton have amine numbers from 0.5 to 1.4 mg of KOH/g and especially from 0.9 to 1.4 mg of KOH/g. The amine numbers of products having other molecular weights can be determined by interpolation or extrapolation.

v) Addition of Hydrogen Sulfide and Thiols

The reactive polyisobutene may be functionalized by reaction with hydrogen sulfide or thiols, such as alkyl or aryl thiols, hydroxy mercaptans, amino mercaptans, thio carboxylic acids or silanethiols, to obtain a polyisobutene functionalized by thio groups.

Suitable hydro-alkylthio additions are described in J. March, Advanced Organic Chemistry, 4th edition, John Wiley & Sons, pages 766-767, incorporated herein in full. The reaction can generally be carried out not only in the absence but also in the presence of initiators and also in the presence of electromagnetic radiation. The addition of hydrogen sulfide gives polyisobutenes functionalized by thiol groups. The reaction with thiols in the absence of initiators generally gives the Markovnikov addition products onto the double bond. Suitable initiators for the hydro-alkylthio addition are for example protic and Lewis acids, such as concentrated sulfuric acid or $AlCl_3$. Useful initiators further include initiators which are capable of forming free radicals. Hydro-alkylthio addition in the presence of these initiators generally gives the anti-Markovnikov addition products. The reaction can also be carried out in the presence of electromagnetic radiation having a wavelength in the range from 10 to 400 nm and preferably in the range from 200 to 300 nm.

vi) Silylation

The reactive polyisobutene may be functionalized by reaction with a silane in the presence of a silylation catalyst to obtain a polyisobutene functionalized by silyl groups.

Suitable hydrosilylation catalysts include for example transition metal catalysts, with the transition metal preferably being selected from Pt, Pd, Rh, Ru and Ir. Suitable platinum catalysts include for example platinum in finely divided form (platinum black), platinum chloride and platinum complexes such as hexachloroplatinic acid. Suitable rhodium catalysts are for example (RhCl(P($C_6H_5$)$_3$)$_3$) and $RhCl_3$. $RuCl_3$ and $IrCl_3$ are also suitable.

Suitable catalysts further include Lewis acids such as $AlCl_3$ or $TiCl_4$ and also peroxides. It may be preferable to use combinations or mixtures of the aforementioned catalysts.

Suitable silanes are for example halogenated silanes, such as trichlorosilane, methyldichlorosilane, dimethylchlorosilane and trimethylsiloxydichlorosilane; alkoxysilanes, such as trimethoxysilane, trimethoxysilane, methyldimethoxysilane, phenyldimethoxysilane, 1,3,3,5,5,7,7-heptamethyl-1,1-dimethoxytetrasiloxane and also acyloxysilanes.

The reaction temperature in the silylation is preferably in the range from 0 to 120° C. and more preferably in the range from 40 to 100° C. The reaction is typically carried out under atmospheric pressure, but it can also be carried out at superatmospheric pressures, for example in the range of about 1.5-20 bar, or reduced pressures, for example in the range from 200 to 600 mbar.

The reaction can be carried out without solvent or in the presence of a suitable solvent. Examples of preferred solvents are toluene, tetrahydrofuran and chloroform.

vii) Addition of Hydrogen Halide or Halogen

The reactive polyisobutene may be functionalized by reaction with hydrogen halide or halogen to obtain a polyisobutene functionalized by halogen groups.

Suitable reaction conditions for the hydro-halo addition are described in J. March, Advanced Organic Chemistry, 4th edition, John Wiley & Sons, pages 758-759, incorporated herein by reference. Hydrogen halides suitable for the addition reaction are in principle HF, HCl, HBr and HI. The addition of HI, HBr and HF can generally be carried out at room temperature, whereas the addition of HCl is generally carried out using elevated temperatures.

The addition of hydrogen halides can in principle be carried out in the absence or in the presence of initiators or of electromagnetic radiation. Addition in the absence of initiators, specifically peroxides, generally gives the Markovnikov addition products. When peroxides are present, the addition of HBr generally leads to anti-Markovnikov products.

The halogenation of double bonds is described in J. March, Advanced Organic Chemistry, 4th edition, John Wiley & Sons, pages 812-814, incorporated by reference. Cl, Br and I can be added using the free halogens. The use of interhalogen compounds is known for obtaining compounds having mixed halogenation. Fluorine is generally added using fluorine-containing compounds, such as $CoF_3$, $XeF_2$ and mixtures of $PbO_2$ and $SF_4$. Bromine generally adds to double bonds at room temperature in good yields. Chlorine can be added not only via the free halogen but also from chlorine-containing reagents, such as $SO_2Cl_2$, $PCl_5$, etc.

When the halogenation is carried out using chlorine or bromine in the presence of electromagnetic radiation, the products obtained are substantially the products of free-radical substitution to the polymer chain and only to a minor extent, if at all, addition products to the terminal double bond.

viii) Hydroboration

The reactive polyisobutene may be functionalized by reaction with a borane (optionally generated in situ) to obtain a hydroxylated polyisobutene.

Suitable hydroboration methods are described in J. March, Advanced Organic Chemistry, 4th edition, John Wiley & Sons, pages 783-789, incorporated herein by reference. Examples of suitable hydroboration reagents are diborane, which is generally generated in situ by reaction of sodium borohydride with $BF_3$ etherate, diisamylborane (bis[3-methylbut-2-yl]borane), 1,1,2-trimethylpropylborane, 9-borabicyclo[3.3.1]nonane, diisocamphylborane (which are obtainable by hydroboration of the corresponding alkenes with diborane), chloroborane-dimethyl sulfide, alkyldichloroboranes or $H_3B—N(C_2H_5)_2$.

The hydroboration is typically carried out in a solvent. Examples of suitable solvents for the hydroboration are acyclic ethers such as diethyl ether, methyl tert-butyl ether, dimethoxyethane, diethylene glycol dimethyl ether, triethylene glycol dimethyl ether, cyclic ethers such as tetrahydrofuran or dioxane and also hydrocarbons such as hexane or toluene or mixtures thereof. The reaction temperature is generally determined by the reactivity of the hydroborating agent and is normally in the range from the melting point to the boiling point of the reaction mixture and preferably in the range from 0° C. to 60° C.

The hydroborating agent is typically used in excess, based on the alkene. The boron atom preferentially adds to the less substituted and hence sterically less hindered carbon atom.

The alkylboranes formed are usually not isolated, but are converted directly into products of value by subsequent reaction. A very important reaction of the alkylboranes is the reaction with alkaline hydrogen peroxide to give an alcohol which preferably corresponds formally to the anti-Markovnikov hydration of the alkene. Furthermore, the alkylboranes obtained can be subjected to a reaction with bromine in the presence of hydroxide ions to give the bromide.

ix) Reaction with an $SO_3$ Source

The reactive polyisobutene may further be functionalized with an $SO_3$ source to obtain a polyisobutene having terminal sulfonic acid groups.

The sulfo-functionalized polyisobutenes can be formed by reaction of the reactive polyisobutenes with an $SO_3$ source. Suitable $SO_3$ sources include a mixture of sulfur trioxide and air, sulfur trioxide hydrates, sulfur trioxide amine complexes, sulfur trioxide ether complexes, sulfur trioxide phosphate complexes, acetyl sulfate, a mixture of sulfur trioxide and acetic acid, sulfamic acid, alkyl sulfates or chlorosulfonic acids. The reaction can be carried out in the absence of a solvent or in an arbitrary inert anhydrous solvent. Suitable reaction temperatures are in the range from −30° C. to +200° C. and depend on the sulfonating reagent used. For example, a sulfonation with acetyl sulfate at low temperatures and elevated temperatures should be avoided, or the product may decompose. The sulfonating reagent is generally used in a molar ratio in the range from 1:1 to 2:1 to polyisobutene. Preference is given to using acetyl sulfate or a mixture of sulfuric acid and acetic anhydride, in which case acetyl sulfate is formed in situ, and the sulfo-functionalized polyisobutene is formed directly. Others of the sulfonating reagents mentioned, for example the mixture of sulfur trioxide and oxygen, may initially form a sultone intermediate, which has to be hydrolyzed to the desired sulfonic acid. A process for preparing sulfo-functionalized polyisobutenes is disclosed for example in WO 01/70830.

x) Functionalization with Amino Groups

The reactive polyisobutene may be functionalized by reaction with nitrogen oxides and subsequently hydrogenated to obtain polyisobutenes having terminal amino groups.

Suitable nitrogen oxides include for example NO, $NO_2$, $N_2O_3$, $N_2O_4$, mixtures of these nitrogen oxides with each other and mixtures of these nitrogen oxides with oxygen. Particular preference is given to mixtures of NO or $NO_2$ with oxygen. The nitrogen oxides may further additionally contain inert gases, for example nitrogen. The reaction of the polyisobutenes with the nitrogen oxides is generally carried out at from −30 to +150° C. in an inert organic solvent. The products obtained are subsequently hydrogenated, preferably by catalytic hydrogenation with hydrogen in the presence of hydrogenation catalysts. The hydrogenation is generally carried out at from 20 to 250° C., depending on the reducing system used. The hydrogenation pressure in the catalytic hydrogenation is generally in the range from 1 bar to 300 bar. A process for preparing amino-terminated addition polymers is described for example in WO 97/03946.

Fibers, Films, Moldings Formed from the Polymer Composition of the Present Invention The polymer compositions of the present invention can be further processed in any desired fashion. The present invention therefore further provides fibers, films and moldings formed from the polymer composition of the present invention.

The term "fibers" as used herein refers to fibers of all lengths and diameters. The term "fibers" as used herein likewise comprehends "filaments" and "staple fibers". The term "fibers" further comprehends not only the individual fibers themselves but yarns, wovens, knits, knotted carpets or nonwoven formed from these fibers. Processes for producing fibers and yarns, wovens, knits, carpets or nonwoven formed therefrom and composed of the polymer compositions according to the present invention are known to one skilled in the art.

The term "films" as used herein comprehends plastic films and sheets of any desired thickness and also their processing products. Suitable processes for producing and processing films are known to one skilled in the art.

By "moldings" are meant any articles, parts, semi-finished products, plates and blown shapes which are producible from the polymer compositions according to the present invention by extrusion molding, injection molding, blow molding and rotor molding with or without calendering.

Production of the Polymer Compositions

The present invention further provides a process for producing the polymer compositions of the present invention, which comprises contacting the hydrophobic polymer, especially the polyolefin, or the starting materials used for preparing the hydrophobic polymer, especially the polyolefin, with at least one polyisobutene modified by terminal polar groups.

Monomers suitable for preparing the hydrophobic polymer, especially the polyolefin, were mentioned above. Processes for preparing hydrophobic polymers and especially polyolefins are known to one skilled in the art.

The polymer compositions and the fibers, films and moldings formed from the polymer compositions of the present invention can be produced in various ways:

a) Preparation of the hydrophobic polymers and especially of the polyolefins in the presence of the modified polyisobutenes used according to the present invention When the hydrophobic polymers and especially the polyolefins are prepared in the presence of the modified polyisobutenes used according to the present invention, the polyisobutenes are generally not incorporated as a copolymer into the hydrophobic polymer and especially the polyolefin, but are merely present in finely divided form in the polymer matrix. However, it is also conceivable for suitably modified polyisobutenes to be firmly incorporated as a copolymer into the hydrophobic polymer and preferably into the polyolefin. In any case, the modified polyisobutenes are not merely applied to the surface of the polyolefin, but become firmly attached in the bulk of the polymer material. Thus, substances used for further modification, for example dyes, can be attached not just to the surface of the polyisobutenes but also to the bulk of the polymer material. This provides for example dyed polymer compositions which can be further processed into the fibers, films and moldings mentioned. The dyes are firmly attached in the polymer compositions, so that lixiviation of the dyes is substantially avoided. Suitable methods are known to one skilled in the art.

b) Addition of modified polyisobutenes in the course of the processing of the hydrophobic polymers (especially polyolefins) used It is likewise possible to add the modified polyisobutenes used according to the present invention in the course of the processing of the hydrophobic polymers, especially polyolefins, into fibers, films and moldings, for example in the course of the extrusion molding, injection molding, blow molding or rotor molding of the hydrophobic polymers, especially polyolefins. In this version of the process, the polymer compositions according to the present invention are mixtures between the hydrophobic polymers (especially polyolefins) used and the modified polyisobutenes. What is achieved in this case too is not merely a modification of the surface of the hydrophobic polymers, especially polyolefins, but a dispersion of the modified polyisobutene within the hydrophobic polymers, especially polyolefins. Suitable methods are known to one skilled in the art.

The present invention accordingly further provides a process for producing the moldings, films and fibers which are according to the present invention, which comprises contacting the modified polyisobutene with the hydrophobic polymer, especially polyolefin, during the processing into moldings, films and fibers.

c) Applying the modified polyisobutenes

It is finally possible to produce fibers, films and moldings from hydrophobic polymers, especially polyolefins, by processes known to one skilled in the art and only then to apply the modified polyisobutenes used according to the present invention by processes known to one skilled in the art. In this case, it is merely the surface of the fibers, films and moldings which is modified by means of the modified polyisobutenes. Thus, for example in the case of a dyeing of the thus modified hydrophilic polymers, especially polyolefins, it is merely the surface of the fibers, films and moldings that is dyed.

The present invention accordingly further provides a process for producing the fibers, films and moldings which are according to the present invention, which comprises applying the modified polyisobutene to the fibers, films and moldings formed from polyolefin.

While the modified polyisobutenes are generally contacted with the hydrophobic polymers, especially polyolefins, without a solvent in versions a) and b), the application of the modified polyisobutenes used according to the present invention in version c) is preferably effected from a solution, emulsion or dispersion of the modified polyisobutenes used according to the present invention in solvents, preferably from aqueous systems, by application in liquid form, by spraying, as a spray, aerosol or in the vapor phase.

The polymer compositions according to the present invention generally comprise from 85% to 99.9% by weight, preferably from 90% to 99.8% by weight and more preferably from 95% to 99.5% by weight of the hydrophobic polymer, especially polyolefin, and generally from 0.1% to 15% by weight, preferably from 0.2% to 10% by weight and more preferably from 0.5% to 5% by weight of the polyisobutene derivative used according to the present invention. The polymer compositions according to the present invention may further optionally comprise further components such as other polymers which are miscible with hydrophobic polymers, especially polyolefins and which are added for example to improve the technological properties, and processing assistants, stabilizers such as UV absorbers, antioxidants and free-radical scavengers (for example HALS amines), antistats, flame retardants, nucleating agents, fillers, as long as they do not form undesirable compounds with the substances according to the present invention. Details are known to one skilled in the art and can be read up for example in the polyolefins chapter of "Ullmanns Encyclopedia (of Technical Chemistry), $6^{th}$ Edition, 2000 Electronic Release" and the references cited therein.

The polymer compositions according to the present invention remedy the disadvantages of the unmodified hydrophobic polymers, especially polyolefins. The polymer compositions according to the present invention and fibers, films and moldings formed from the polymer compositions according to the present invention are dyeable from aqueous baths, directly coatable or printable and adherable to other materials. Thus the polymer compositions according to the present invention are very useful for industrial and automotive textiles and apparel fibers, specifically in the sports and outdoor apparel sector, and also as dyeable and printable fibers for producing textile sheet materials, such as carpets or nonwovens, and for parts and semi-finished products for the automotive, building construction and household sectors, as housings for a very wide variety of instruments, for packaging, industrial applications.

Dyeing of the Polymer Composition According to the Present Invention

The present invention accordingly further provides a process for dyeing the polymer composition according to the present invention or the fibers, films and moldings according to the present invention, which comprises contacting a liquor containing at least one dye with the polymer composition or the fibers, films and moldings.

The composition of the liquor is dependent on the dyeing method used and on the dye used. The choice of suitable dyes depends on the requirements with regard for example to in-service fastnesses, depth of shade and brilliance of the dyeing, whereby the choice of functionalization of the modified polyisobutene used according to the present invention is determined. Good adhesion of the dye in the polymer composition or the fibers, films and moldings formed from the polymer composition is obtained whenever the functional groups of the dyes used are complementary to the terminal polar groups of the polyisobutenes used.

By "complementary group" as used herein is meant a pair of functional groups which are able to react with each other by forming a covalent bond, salt formation through electrostatic interaction, hydrogen bonding or van der Waals interactions.

Useful dyes include in principle all known dyes selected from cationic dyes, anionic dyes, mordant dyes, direct or substantive dyes, disperse dyes, ingrain dyes, vat dyes, metalized dyes, reactive dyes, sulfur dyes dyes. The use of the various dyes is dependent inter alia on the modified polyisobutene used for modifying the polyolefins.

There now follows a recitation of the modified polyisobutenes obtained after a functionalization as per one of the steps i) to x) and of the dyes suitable for dyeing the polymer compositions containing these modified polyisobutenes:

i) Alkylation of Aromatic Hydroxy Compounds

The alkylation of aromatic hydroxy compounds and of phenols in particular yields polyisobutenylphenols. Polyisobutenylphenols are modified polyisobutenes which are able to interact with disperse dyes, direct dyes, vat dyes, metalized dyes, reactive dyes, sulfur dyes and substantive and also (in the event of a substitution with anionic or cationic functional groups) with cationic and anionic, as the case may be, dyes.

A further functionalization of the polyisobutenylphenols obtained in step i) by a Mannich reaction with at least one aldehyde and at least one amine yields a polyisobutene-alkylated and additional amino-alkylated compound. These modified polyisobutenes are able to interact with anionic dyes because of the positive charge on the amino group, which charge may be permanent as a consequence of quaternization of the amino group or temporary in the case of acidic dyeing conditions.

ii) Epoxidation

Epoxidation of the polyisobutenes gives an epoxidized polyisobutene. This is able to interact with mordant dyes, direct dyes, disperse dyes, ingrain dyes, vat dyes, metalized dyes, reactive dyes, sulfur dyes and substantive dyes.

The epoxidized polyisobutenes obtained in step ii) may be further functionalized by reaction with ammonia to obtain polyisobutylamino alcohols. These are able, under suitable conditions, to preferentially interact with anionic dyes.

iii) Ene Reaction

An ene reaction yields in particular polyisobutenes modified by succinic anhydride groups. The anhydride groups of the substances according to the present invention can be hydrolyzed to dicarboxylic acid radicals prior to processing or at least partially react during the processing according to the present invention to form dicarboxylic acid radicals. The anhydride and dicarboxylic acid groups are able to preferentially interact with cationic dyes.

The polyisobutenes modified by succinic anhydride groups can react with maleic anhydride for a second time to form a product having two succinic anhydride groups at the chain end (known as PIBBSA). PIBBSA is in turn able to preferentially interact with cationic dyes.

iv) Hydroformylation

Hydroformylation is a way of obtaining polyisobutenes having alcohol groups. These can interact with mordant dyes, direct or substantive dyes, disperse dyes, ingrain dyes, vat dyes, metalized dyes, reactive dyes, sulfur dyes and.

Further functionalization of the modified polyisobutenes obtained by the reaction as per iv) makes it possible to obtain various functionalized isobutenes:

A) Oxocarboxylic Acids

Oxidation of the hydroformylated polyisobutenes is a way to obtain carboxyl-functionalized polyisobutenes. These are preferentially able to interact with cationic dyes.

B) Oxo Alcohols

Reaction with hydrogen in the presence of a hydrogenation catalyst converts the hydroformylated polyisobutenes into alcohol-functionalized polyisobutenes, if these are not already directly obtained in the course of the hydroformylation. These are able to interact with mordant dyes, direct dyes, disperse dyes, ingrain dyes, vat dyes, metalized dyes, reactive dyes, sulfur dyes and substantive dyes. The polyisobutenes functionalized by alcohol groups may additionally be alkoxylated with alkylene oxides, preferably ethylene oxide. The modified polyisobutenes obtained are able to interact with mordant dyes, direct or substantive dyes, disperse dyes, ingrain dyes, vat dyes, metalized dyes, reactive dyes, sulfur dyes and cationic dyes.

C) Amine Synthesis

The hydroformylated isobutenes obtained in step iv) can be reacted with hydrogen and ammonia or a primary or secondary amine in the presence of an amination catalyst to obtain polyisobutenes functionalized by amine groups. These polyisobutenes are able to preferentially interact with anionic dyes.

V) Addition of Hydrogen Sulfide or Thiols

Reaction of polyisobutene with hydrogen sulfide or a thiol is a way to obtain thio-functionalized polyisobutenes. These are able to interact with mordant dyes, direct dyes, disperse dyes, ingrain dyes, vat dyes, metalized dyes, reactive dyes, sulfur dyes, substantive and cationic dyes.

vi) Silylation

Functionalization of the polyisobutenes with silanes gives silyl-functionalized polyisobutenes. These are able to interact with mordant dyes, direct dyes, disperse dyes, ingrain dyes, vat dyes, metalized dyes, reactive dyes, sulfur dyes, substantive and cationic dyes.

vii) Addition of Hydrogen Halide or Halogen

Functionalization of polyisobutene with halogenic hydrogen or a halogen is a way to obtain polyisobutenes functionalized by halogen groups. These polyisobutenes are able to interact with disperse dyes, direct dyes and sulfur dyes.

viii) Hydroboration

Hydroboration of the polyisobutenes is a way to obtain alcohols. These are able to interact with mordant dyes, direct dyes, disperse dyes, ingrain dyes, vat dyes, metalized dyes, reactive dyes, sulfur dyes and substantive dyes.

ix) Reaction with an $SO_3$ Source

Reaction with compounds which transfer $SO_3$ groups is a way to obtain polyisobutenes having terminal sulfonic acid groups. These are able to preferentially interact with cationic dyes.

x) Reaction with Nitrogen Oxides and Subsequent Hydrogenation

Reaction with nitrogen oxides and subsequent hydrogenation of the polyisobutenes makes polyisobutenes having terminal amino groups available. These are able to preferentially interact with anionic dyes.

The foregoing enumeration represents only a small selection from the numerous possibilities for dyeing the polymer compositions according to the present invention. Owing to the numerous possible ways of functionalizing the modified polyisobutenes used according to the present invention it is possible to obtain polyolefin compositions which can interact with, ie be dyed by, numerous different dyes. It is thus possible to arrive at an optimum combination of polymer composition, comprising a modified polyisobutene, and a dye for any application. The polymer compositions according to the present invention hence are very widely useable.

To obtain high in-service fastnesses, dyeing with ionic dyes may be preferable. When it is necessary to dye the polyolefin fibers in a blend with other fiber varieties, such as natural fibers (for example cotton or wool) or synthetic fibers (such as polyester or polyamide), it may be preferable to dye both fibers with the same type of dye, for example to dye a cotton-polypropylene blend with direct dyes.

Suitable liquors for dyeing the polymer compositions of the present invention or the fibers, films and moldings of the present invention and also suitable dyeing methods and suitable dyes for the various dyeing methods are known to one skilled in the art. The dyeings can be effected in different forms of makeup (as yarn, tow, woven fabric, knitted fabric or nonwoven) batchwise in customary dyeing machines such as winch becks, yarn dyeing machines, beam dyeing machines and jets or continuously by nip-padding, face-padding, spraying or foam application processes using suitable drying and fixing means.

The present invention further provides dyed polymer compositions comprising:
- a) at least one hydrophobic polymer and especially a polyolefin,
- b) at least one polyisobutene which is modified by terminal polar groups and is obtainable by functionalization of reactive polyisobutene having a number average molecular weight $M_n$ from 150 to 50 000, and
- c) at least one dye.

Suitable polyolefins, polyisobutenes and dyes are as mentioned above.

Particular preference is given to combinations of anionically and cationically modified polyisobutenes and the oppositely charged dyes.

These polymer compositions combine the excellent properties of the polyolefins with a good dyeability, which is achieved because of the modified polyisobutenes used. The polymer compositions are notable for the dye being firmly fixed in the polymer composition and being resistant to lixiviation. Furthermore, the polymer compositions can be dyed with the processes known for the dyes which are suitable in each case and assistants for dyeing polymer compositions.

The present invention further provides fibers, films and moldings formed from the dyed polymer composition of the present invention.

The dyed polymer compositions of the present invention and the dyed fibers, films and moldings of the present invention are obtainable in various ways. This is dependent inter alia on when the modified polyisobutene is added to the hydrophobic polymer, especially polyolefin. As explained above, this is possible directly in the course of the preparation of the hydrophobic polymer, especially polyolefin, in the course of its further processing or following its processing. The dye is preferably incorporated in the polymer composition following processing or applied to the fibers, films and moldings obtained. However, it is also possible for the polymer composition itself to be dyed directly.

The present invention further provides for the use of at least one polyisobutene modified by terminal polar groups which is obtainable by functionalization of reactive polyisobutene having a number average molecular weight $M_n$ from 150 to 50 000 for hydrophilicizing hydrophobic polymers, especially polyolefins.

Preferred modified polyisobutenes and also preferred hydrophobic polymers, especially polyolefins, are known to one skilled in the art. The term "hydrophilicization" is likewise known to one skilled in the art.

The examples which follow illustrate the invention.

EXAMPLES

Extrusion Tests

Polypropylene: Metocene® X50248 (from Basell). Metocene® X50248 is a homopolypropylene (metallocene catalysis). It is specifically useful for nonwovens, staple fibers and filaments.

Product data of homopolypropylene without additions:

| Properties | Method | Unit | Values |
|---|---|---|---|
| Melt flow rate | ISO 1133 | g/10 min | 18 |
| Tensile strength | ISO 527-2 | MPa | 32 |
| Elongation | ISO 527-2 | % | 9 |
| Elongation at break | ISO 527-2 | % | >50 |
| Melting point (DSC) | ISO 3146 | ° C. | 146 |

-continued

| Properties | Method | Unit | Values |
|---|---|---|---|
| Temperature of deflection under load | ISO 75-2 | ° C. | 88 |
| Density | ISO 1183 | G/cm³ | 0.91 |

In each case, 5% by weight of the hereinbelow specified polyisobutenes modified by terminal polar groups was added to the polypropylene chips.

The tests were carried out in a twin-screw extruder at a housing temperature of 180° C. and 200 rpm. Die outputs are 1×4 mm.

The throughput is 5 kg/h and the polyisobutene additive modified by polar groups is added at a throughput of 250 g/h. The metering pump runs at 100-200 g/h.

Spinning:
The stretch ratio is 3:1 and the linear density is 17 dtex. Spinning takes place at 200° C./230° C.

Production of Textile Sheet Materials:
All the extruded polymer fibers additized with the substances of the present invention were processed into woven or knitted fabrics which were dyed by the hereinbelow specified methods. The use of textile sheet materials ensures the evaluation of the levelness of textile finishing operations and, for example, of the hand.

Test Plates:
Each chip product obtained after extrusion was used to press plates (about 160×160×2 mm; weight about 46 g; pressing time 4 min at 220° C., 1 min each at 50, 100, 150 and 200 bar).

The plates obtained were used for dyeing tests:

Dyeings:
The dyeings were carried out by heating the knits produced from polypropylene additized with the substances according to the present invention in demineralized water in the presence of the stated dyes at the stated pH in an AHIBA dyeing machine from initially 110° C. to 130° C. over 20 minutes and leaving them at 130° C. for 2 hours. The liquor ratio, ie the ratio of the volume of the treatment bath in liters to the mass of the dry polypropylene knit in kilograms, was 50:1. After dyeing, the dyeings were cooled to about 80° C., removed, rinsed cold and dried at 100° C.

The depth of shade achieved was evaluated. A comparative knit formed from nonadditized polypropylene and co-treated in each case exhibited no dyeing whatsoever.

Cationic Dyeing:
1.1% of Basacryl Red X-BL 300%

Polyisobutene Used According to the Present Invention:
- a) polyisobutene succinic anhydride obtained from polyisobutene of molar mass 550 by ene reaction with maleic anhydride and hydrolyzed with water to the dicarboxylic acid;
- b) polyisobutenesulfonic acid prepared similarly to WO 01/70830 A2 from polyisobutene of molar mass 550 or 1000 by sulfonation;
- c) polyisobutene succinic anhydride obtained from polyisobutene of molar mass 550 by ene reaction with maleic anhydride and reacted with polyglycol ether of molar mass 300 to the corresponding monoester.

Liquor ratio=50:1 (Note. The long liquor ratios reported here were used on account of the small substrate quantities and are not associated with the substances used according to the present invention. The currently customary, very short liquor ratios can be used on an industrial scale.)

pH 6, set with buffer solution

Anionic Dye:
  2.5% of Telon Red FRL 200%

Polyisobutene Used According to the Present Invention:
  d) polyisobutene Mannich TEPA prepared in accordance with or in analogy with WO 01/25 293 and WO 01/25 294) from polyisobutene of molar mass 1000 by alkylation with phenol and subsequent Mannich reaction with formaldehyde and tetraethylenepentamine;
  e) polyisobutene succinic anhydride obtained from polyisobutene of molar mass 1000 by ene reaction with maleic anhydride and reacted with tetraethylenepentamine to form the corresponding succinimide.
  Liquor ratio=50:1
  pH 4.5, set with buffer solution The dyeings obtained were even without a leveling agent level and deep in shade. In the case of PIBSA PEG monoester, the dyeings were distinctly more light-colored. The hand of the knit fabrics was not harshened. The washfastness of the dyeings obtained was determined in a high-speed wash with 2 g/l of FEWA mild detergent, liquor ratio 200:1, 5 minutes at 60° C. The evaluation criterion was whether the PP dyeing became lighter during the wash, ie whether there was dye bleed, and whether adjacent fabric was stained.

All the substances according to the present invention gave satisfactory washfastnesses.

Preparation of the Modified Polyisobutene Derivatives Used as per a) to e)

Re a)
  Preparation of PIB succinic anhydride similarly to DE-A 4 319 672, EP-A 0 156 310 or H. Mach and P. Rath in "Lubrication Science II" (1999), p. 175-185. Hydrolysis of PIBSA 550:
  A 1 l three-neck flask is charged with 50 ml of water and 50 ml of tetrahydrofuran at room temperature. A solution of 275 g of PIBSA (85% of α-olefin fractions, Mn=550; DP=1.65; based on polyisobutene) in 150 ml of tetrahydrofuran was added dropwise. This is followed by stirring at that temperature for 30 min. Thereafter, the solvent is completely stripped off under reduced pressure. To remove the remaining water, it is entrained out as an azeotrope with toluene. This is followed by drying over $Na_2SO_4$.
  IR spectrum: OH vibration at 3454 $cm^{-1}$, C=O stretch vibration of succinic acid structure at 1710 $cm^{-1}$, C=C stretch vibration 1636 $cm^{-1}$. In addition there are vibrations of the PIB structure at 2951, 2896, 1473, 1389, 1365 and 1236 $cm^{-1}$.

Re b)
  Preparation similarly to WO 01/70830 A2

Re c)
  Reaction of polyisobutene 550 with polyglycol ether 300 to form the corresponding monoester.
  A 2 l three-neck flask is charged with 347 g of PIBSA (85% of α-olefin fractions, $M_n$=550; DP=1.65; based on polyisobutene), and the contents are heated to 90° C. 300 g of polyethylene glycol (Pluriol® E 300, $M_n$=300) which had been heated to 80° C. are added dropwise. On completion of the addition the batch is stirred at 90° C. for 3 hours and then cooled down.
  IR spectrum: OH vibration at 3298 $cm^{-1}$, C=O stretch vibration of succinic monoester structure at 1734 $cm^{-1}$, C=C stretch vibration 1639 $cm^{-1}$, C—O—C ether vibration at 1110 $cm^{-1}$. In addition there are vibrations of the PIB structure at 2953, 2893, 1471, 1389, 1366 and 1233 $cm^{-1}$.
  Reactions with variable PIBSA radicals (PIB fraction $M_n$=200, 550, 1000, 2300, etc) and polyethylene glycol radicals ($M_n$=300, 600, 1500, 4000, 6000, 9000, 12000, etc) were carried out in similar fashion having regard to the starting weights.

Re d)
  Preparation similarly to WO 01/25 293 and WO 01/25 294

Re f)
  PIBSA 1000 with tetraethylpentamine (PIBSA imide)
  A 2 l four-neck flask is charged with 582 g of PIBSA (85% of α-olefin fractions, $M_n$=1000; DP=1.70; based on polyisobutene) and 63.8 g of ethylhexanol under an inert gas atmosphere (nitrogen). This is followed by heating to 140° C. before 99.4 g of tetraethylpentamine are added dropwise. On completion of the addition, the temperature is raised to 160° C. and maintained for 3 h. During the reaction, volatiles distill over to some extent. For completion, the pressure is reduced to 500 mbar for 30 min toward the end of the reaction. This is followed by cooling to room temperature. IR spectrum: NH vibration at 3295, 1652 $cm^{-1}$, C=O stretch vibration of succinimide structure at 1769, 1698 $cm^{-1}$. In addition there are vibrations of the PIB structure at 2953, 1465, 1396, 1365 and 1238 $cm^{-1}$.

We claim:
1. A polymer composition comprising
  a) at least one hydrophobic polymer in the form of a homo- or copolymer of propylene or in the form of a homo- or copolymer of ethylene, and
  b) at least one polyisobutene which is modified by terminal polar groups and is obtained by functionalization of reactive polyisobutene having a number average molecular weight $M_n$ from 150 to 50,000.

2. A polymer composition as claimed in claim 1, wherein said reactive polyisobutene has a terminal double bond content of not less than 50 mol %.

3. A polymer composition as claimed in claim 1, wherein said functionalization of said polyisobutene is accomplished in one or more stages and is selected from
  i) reaction with aromatic hydroxy compounds in the presence of an alkylation catalyst to obtain polyisobutene-alkylated aromatic hydroxy compounds;
  ii) reaction of said polyisobutene with a peroxy compound to obtain an epoxidized polyisobutene;
  iii) reaction of said polyisobutene with an alkene having an electrophilically substituted double bond (an enophile) in an ene reaction;
  iv) reaction of said polyisobutene with carbon monoxide and hydrogen in the presence of a hydroformylation catalyst to obtain a hydroformylated polyisobutene;
  v) reaction of said polyisobutene with hydrogen sulfide or a thiol to obtain a thio-functionalized polyisobutene;
  vi) reaction of said polyisobutene with halogen or a hydrogen halide to obtain a halogen-functionalized polyisobutene;
  vii) reaction of said polyisobutene with a borane and subsequent oxidative cleavage to obtain a hydroxylated polyisobutene;
  viii) reaction of said polyisobutene with a silane in the presence of a silylation catalyst to obtain a silyl-functionalized polyisobutene;
  ix) reaction of said polyisobutene with an $SO_3$ source to obtain polyisobutenes having terminal sulfonic acid groups;
  x) reaction of said polyisobutene with nitrogen oxides and subsequent hydrogenation to obtain polyisobutenes having terminal amino groups.

4. A polymer composition as claimed in claim 3, wherein said functionalization of said polyisobutene is accomplished by reaction of said polyisobutene with acetyl sulfate as the $SO_3$ source to obtain polyisobutenes having terminal sulfonic acid groups.

5. A fiber, film or molding formed from a polymer composition as claimed in claim 1.

6. A process for producing a polymer composition as claimed in claim 1, which comprises contacting said hydrophobic polymer (component a) or the monomers used for preparing said hydrophobic polymer with at least one polyisobutene modified by terminal polar groups (component b).

7. A process as claimed in claim 6, wherein said polyisobutene is used as a comonomer in the preparation of said hydrophobic polymer.

8. A process for producing a molding, film or fiber as claimed in claim 5, which comprises contacting at least one polyisobutene modified by terminal polar groups with said hydrophobic polymer during the processing into a molding, film or fiber.

9. A process for producing a fiber, film or molding as claimed in claim 5, which comprises applying at least one polyisobutene modified by terminal polar groups onto said fiber, film or molding formed from said hydrophobic polymer.

10. A process for dyeing a polymer composition comprising
  a) at least one hydrophobic polymer in the form of a homo- or copolymer of propylene or in the form of a homo- or copolymer of ethylene, and
  b) at least one polyisobutene which is modified by terminal polar groups and is obtained by functionalization of reactive polyisobutene having a number average molecular weight $M_n$ from 150 to 50,000 or a fiber, film or molding formed from said polymer composition, which process comprises contacting said polymer composition or said fiber, film or molding with a liquor containing at least one dye.

11. A dyed polymer composition comprising (1) a polymer composition comprising
  a) at least one hydrophobic polymer in the form of a homo- or copolymer of propylene or in the form of a homo- or copolymer of ethylene, and
  b) at least one polyisobutene which is modified by terminal polar groups and is obtained by functionalization of reactive polyisobutene having a number average molecular weight $M_n$ from 150 to 50,000 and (2) at least one dye.

12. A fiber, film or molding formed from a dyed polymer composition as claimed in claim 11.

13. A method of hydrophilicizing hydrophobic polymers in the form of a homo- or copolymer of propylene or in the form of a homo- or copolymer of ethylene, comprising the step of contacting said hydrophobic polymers in the form of a homo- or copolymer of propylene or in the form of a homo- or copolymer of ethylene, with at least one polyIsobutene modified by terminal polar groups and is obtained by functionalization of reactive polyisobutene having a number average molecular weight $M_n$ from 150 to 50,000.

* * * * *

UNITED STATES PATENT AND TRADEMARK OFFICE
CERTIFICATE OF CORRECTION

PATENT NO. : 7,498,386 B2
APPLICATION NO. : 10/530929
DATED : March 3, 2009
INVENTOR(S) : Ulrich Karl et al.

It is certified that error appears in the above-identified patent and that said Letters Patent is hereby corrected as shown below:

In the Claims:

In Claim 13, in column 26, on line 24, "polyIsobutene" and should be --polyisobutene--.

Signed and Sealed this

Twelfth Day of May, 2009

JOHN DOLL
*Acting Director of the United States Patent and Trademark Office*